United States Patent [19]

Perronnet et al.

[11] 3,742,036
[45] June 26, 1973

[54] O-(N-ALKYL CARBAMOYL)CARBALKOXY-CHLOROFORMALDOXIME AND PROCESS FOR THE PREPARATION THEREOF

[75] Inventors: Jacques Perronnet, Paris; Jean-Pierre Demoute, Montreuil sous Bols, both of France

[73] Assignee: Roussel-Vclaf, Paris, France

[22] Filed: July 6, 1971

[21] Appl. No.: 160,215

[30] Foreign Application Priority Data

July 10, 1970 France .............................. 7025738

[52] U.S. Cl. .............................. 260/482 R, 424/314
[51] Int. Cl. .......................................... C07c 131/00
[58] Field of Search ..................... 260/482 R, 482 C, 260/566 AL

[56] References Cited
UNITED STATES PATENTS 3,576,834  4/1971  Buchanan .......................... 260/482

Primary Examiner—Lorraine A. Weinberger
Assistant Examiner—Paul J. Killos
Attorney—Hammond & Littell

[57] ABSTRACT

Substituted oximes of the formula

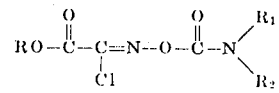

wherein R and $R_1$ may be different and are lower alkyl and $R_2$ is selected from the group consisting of hydrogen and lower alkyl having excellent pesticidal properties and their preparation.

3 Claims, No Drawings

O-(N-ALKYL CARBAMOYL)CARBALKOXY-CHLOROFORMALDOXIME AND PROCESS FOR THE PREPARATION THEREOF

OBJECTS OF THE INVENTION

It is an object of the invention to provide the novel oximes of formula I.

It is another object of the invention to provide a novel process for the preparation of the oximes of formula I.

It is a further object of the invention to provide novel pesticidal compositions.

It is an additional object of the invention to provide a novel method of combatting bacteria and/or fungi.

These and other objects and advantages of the invention will become obvious from the following detailed description.

THE INVENTION

The novel oximes of the invention have the formula

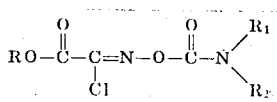

wherein R and $R_1$ may be different and are lower alkyl and $R_2$ is selected from the group consisting of hydrogen and lower alkyl. R, $R_1$ and $R_2$ are preferably alkyl of one to four carbon atoms such as methyl, ethyl, propyl, isopropyl or butyl.

The novel process of the invention for preparing the oximes of formula I comprises reacting in the presence of an organic base a carboalkoxy chloroformaldoxime of the formula

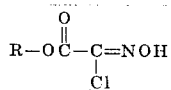

wherein R has the above definition with a reactant having a carbamide group of the formula $$Z = C = O$$

III wherein Z is selected from the group consisting of =N — $R_1$ and

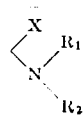

wherein $R_1$ and $R_2$ have the above definition and X is chlorine or bromine to form the corresponding oxime of formula I.

Examples of the organic bases are triethylamine, triethylenediamine, N-methyl-piperidine, pyridine, trimethylamine, N-methylpyrrolidine and quinoline.

In a preferred mode of the process, the compound of formula III is an alkyl isocyanate or N-mono or di substituted carbamoyl chloride. The starting carbalkoxy chloroformaldoximes can be prepared by the process described by Skinner et al. [JACS, Vol 46(1924), p.73-8].

The novel pesticidal compositions of the invention are comprised of an effective amount of at least one oxime of formula I and an inert carrier. The compositions may be in the form of powders, suspensions, emulsions or solutions containing the active principle, cationic, anionic or non-ionic surface active agents, inert powders such as talc, clays, silicates, Kieselguhr, etc. a vehicle such as water, alcohols, hydrocarbons or other organic solvents, animal, vegetable or mineral oils.

The bactericidal activity of the compositions have been shown in tests effected in the presence of materials such as paper pulp and sizing resins under conditions analogous to industrial practice. The fungicidal activity has been shown in tests with Septoria nodorum.

The novel method of combatting microorganisms comprises contacting microorganisms with a lethal amount of at least one oxime of formula I. The method is useful for preventing microbial slime in paper pulp.

In the following example there is described a preferred embodiment to illustrate the invention. However, it should be understood that the invention is not intended to be limited to the specific embodiments.

EXAMPLE

O — (N-methylcarbamoyl) carbethoxy — chloroformaldoxime

A mixture of 30.2 g of carbethoxy chloroformaldoxime [prepared by the process of Skinner et al., J. A. C. S, Vol. 46 (1924), p. 738], 30 cc of methyl isocyanate and a trace of triethylamine in 300 cc of tetrahydrofuran was refluxed for 4 hours and then evaporated to dryness. The resulting colorless oil was solidified from isopropyl ether and the resulting crystals were recovered by vacuum filtration, washed with isopropyl ether and dried under reduced pressure to obtain 21 g of O — (N-methylcarbamoyl) carbethoxy chloroformaldoxime in the form of white crystals melting at 94° C. The product was soluble in chloroform, slightly soluble in ethanol, benzene and methyl ethyl ketone and insoluble in isopropyl ether.

Analysis: $C_6 H_9 Cl N_2 O_4$ ; molecular weight = 208.60

Calculated: %C, 34.55; %H, 4.35; %Cl, 16.99; %N, 13.43;

Found: 34.6; 4.3; 17.2; 13.4.

As far as it is known, this compound is not described in the literature.

A. BIOCIDAL STUDY 9.7 liters of paper pulp of 12.5 g per liter were added to 200 cc of 2 percent resin sizing. The mixture was then contaminated with 100 cc of inoculum of Aerobacter aerogenes and then was incubated at 35° C with agitation. On the second day, a first count of the germs was made and the mixture was treated by direct incorporation of the product to be tested at concentrations of 50, 25, 12.5 and 6.25 ppm. The level was readjusted with sterile water and the number of germs was counted at 1 hour, 4 hours, 7 hours and 23 hours after treatment. On the third day, the number of germs was determined and the level of the medium was adjusted with sterile water. The mixture was recontaminated with 100 cc of Aerobacter aerogenes and the number of germs were determined at 1 hour, 4, 7 and 23 hours after recontamination. The results are expressed as a percent of antibacterial efficacy and the results are set forth in Tables I and II.

TABLE I

| Hours after Treatment | PERCENT OF EFFICACY at doses in ppm | | | |
|---|---|---|---|---|
| | 50 | 25 | 12.5 | 6.5 |
| 1 | 99.8 | 99.8 | 99.6 | 99.8 |
| 4 | 100 | 99.8 | 99.7 | 99.7 |
| 7 | 99.2 | 100 | 99.5 | 99.5 |
| 23 | 87.2 | 76.2 | 39.0 | 59.6 |

TABLE II

| Hours after Treatment | PERCENT OF EFFICACY after recontamination | | | |
|---|---|---|---|---|
| | 50 ppm | 25 ppm | 12.5 ppm | 6.5 ppm |
| 25 | 78.6 | 59.5 | 22.8 | 27.7 |
| 28 | 66.3 | 66.0 | 46.8 | 45.9 |
| 31 | 31.0 | 53.8 | 0 | 3.1 |
| 52 | 0 | 4.5 | 12.9 | 18.8 |

The results of Tables I and II show that O—(N-methylcarbamoyl) carbethoxy chloroformaldoxime has a very interesting immediate biocidal activity.

B. Fungicidal Activity

The fungicidal activity of O — (N-methylcarbamoyl) carbethoxy chloroformaldoxime was determined by treatment of wheat grains contaminated with Septoria nodorum. The treatment was effected on 25 contaminated grains in the form of a powder at a dose corresponding to 80 g of active material per 100 kg. The grains were then allowed to germinate at 5° C. A parallel test was effected by treatment with methoxyethyl mercury silicate at a dose of 3 g of mercury per 100 kg. The results are in Table III.

TABLE III

| Product | %healthy plants | %plants withered | %plants with weak spots | %plants with strong spots | %grains not germinating |
|---|---|---|---|---|---|
| O-(N-methyl-carbamoyl) carbethoxy-chloro-formal-doxime | 64 | 4 | 11 | 2 | 19 |
| methoxyethyl mercury silicate | 64 | 2 | 3 | 12 | 19 |

Various modifications of the products and method of the invention may be made without departing from the spirit or scope thereof and it is to be understood that the inventon is not intended to be limited except as in the appended claims.

We claim:

1. An oxime of the formula

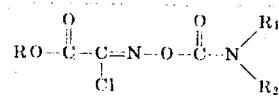

wherein R and R$_1$ may be different and are lower alkyl and R$_2$ is selected from the group consisting of hydrogen and lower alkyl.

2. A compound of claim 1 which is O — (N-methylcarbamoyl) - carbethoxy chloroformaldoxime.

3. A process for the preparation of a compound of claim 1 comprising reacting in the presence of an organic base a carbalkoxy chloroformaldoxime of the formula

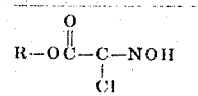

wherein R has the above definition with a reactant having a carbamide group of the formula $$Z = C = O$$

wherein Z is selected from the group consisting of =N—R$_1$ and

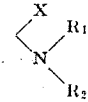

wherein R$_1$ and R$_2$ have the above definition and X is chlorine or bromine to form the corresponding oxime of claim 1.

* * * * *